(12) United States Patent
Gordon

(10) Patent No.: US 10,334,985 B2
(45) Date of Patent: Jul. 2, 2019

(54) DISPOSABLE GRILL CLEANING DEVICE

(71) Applicant: Qloud Products, LLC, Orlando, FL (US)

(72) Inventor: Garret Gordon, Orlando, FL (US)

(73) Assignee: Qloud Products LLC, Orlando, FL (US)

( * ) Notice: Subject to any disclaimer, the term of this patent is extended or adjusted under 35 U.S.C. 154(b) by 384 days.

(21) Appl. No.: 15/148,616

(22) Filed: May 6, 2016

(65) Prior Publication Data

US 2016/0325317 A1 Nov. 10, 2016

Related U.S. Application Data

(60) Provisional application No. 62/158,867, filed on May 8, 2015.

(51) Int. Cl.
| | |
|---|---|
| *B08B 1/00* | (2006.01) |
| *A47J 37/07* | (2006.01) |
| *A47L 13/10* | (2006.01) |
| *A47L 13/12* | (2006.01) |
| *A47L 17/00* | (2006.01) |
| *A47L 17/06* | (2006.01) |

(52) U.S. Cl.
CPC .......... *A47J 37/0786* (2013.01); *A47L 13/12* (2013.01); *A47L 17/00* (2013.01); *A47L 17/06* (2013.01); *B08B 1/005* (2013.01); *A47L 13/10* (2013.01)

(58) Field of Classification Search
CPC ...... A47J 37/0786; A47J 43/288; A47J 43/28; A47L 13/02; A47L 13/10; A47L 13/34; A47L 17/00; A47L 17/06; A47L 13/44; A47L 13/03; A47L 13/16; A47L 13/06; A47L 17/08; A47L 13/022; A47L 13/17; B08B 1/005; B08B 1/00; B29C 66/02245; B65D 11/24
USPC ... 15/201.1, 236.01, 236.06, 236.07, 236.09, 15/210.1, 201, 244.1, 244.4, 229.11, 15/229.13; 206/204, 557, 558, 559, 560, 206/561, 562, 563, 564, 565
See application file for complete search history.

(56) References Cited

U.S. PATENT DOCUMENTS

| | | | | |
|---|---|---|---|---|
| 5,373,600 | A | * 12/1994 | Stojanovski | ............ A47L 13/34 15/111 |
| 6,125,493 | A | * 10/2000 | Daw | ..................... A41D 13/085 15/111 |
| 6,276,023 | B1 | * 8/2001 | Grundy | ............... A47J 37/0786 15/118 |
| 8,209,812 | B1 | * 7/2012 | Dondurur | .............. A46B 9/005 134/6 |
| 9,545,173 | B2 | * 1/2017 | Brown | ................. A23B 4/0523 |

(Continued)

*Primary Examiner* — Joseph J Hail
*Assistant Examiner* — Timothy Brian Brady
(74) *Attorney, Agent, or Firm* — Jason T. Daniel, Esq.; Daniel Law Offices, P.A.

(57) ABSTRACT

A grill cleaning device includes a main body having a top surface, a bottom surface and a plurality of side walls extending upward therefrom. A handle is located at the center of the main body equidistantly from each of the side walls. A pocket area is formed by the combination of the bottom surface, the side walls and the handle for receiving a human hand. A plurality of elongated channels are disposed along the bottom surface of the main body. Each of the channels include a particular shape, size and separation distance for engaging rods of grill grates having different shapes and sizes.

12 Claims, 4 Drawing Sheets

(56) References Cited

U.S. PATENT DOCUMENTS

| | | | |
|---|---|---|---|
| 2009/0188061 A1* | 7/2009 | Cybulski | A47J 37/0786 15/111 |
| 2009/0199868 A1* | 8/2009 | Cybulski | A47L 13/022 134/6 |
| 2011/0119850 A1* | 5/2011 | Mallory | A47L 13/16 15/209.1 |
| 2012/0011675 A1* | 1/2012 | Goble | A47L 13/022 15/236.01 |

* cited by examiner

DISPOSABLE GRILL CLEANING DEVICE

CROSS-REFERENCE TO RELATED APPLICATIONS

This application claims the benefit of U.S. Application Ser. No. 62/158,867 filed on May 8, 2015, the contents of which are incorporated herein by reference.

TECHNICAL FIELD

The present invention relates generally to cleaning devices, and more particularly to a disposable grill cleaner that is constructed from recycled material.

BACKGROUND

The statements in this section merely provide background information related to the present disclosure and may not constitute prior art.

One of the main drawbacks to the use of outdoor barbecue grills is the effort necessary to ensure that the rack on which the food is cooked is clean and free of debris. It is well known that when food is cooked on a grill, grease and small bits of food have a tendency to stick to the metallic surface of the grill racks. Over time, this material becomes charred and forms a thick layer of grime which is difficult to remove.

For this reason, there are many known devices and methods for cleaning a grill. The most common approach is to utilize some form of brush to physically scrape debris from the grill. These brushes are typically constructed with wood and/or plastic handles, and incorporate metal scrapers and bristles. As such, these devices are relatively expensive to manufacture and are generally not recyclable, thereby adding to the overcrowded landfills when such devices are ultimately discarded.

Moreover, although these conventional grill brushes are useful for removing solid material, they do not remove grease, thereby forcing users to wash or soak the grill with chemical cleaners after the scrubbing process has completed. Additionally, as the brush itself has a tendency to collect the soiled grill material, users are also forced to clean the brush after each use, otherwise the brush will deposit the previously collected material back onto the grill surface when the user next attempts to clean the grill.

In light of the above, it would be beneficial to provide an environmentally friendly grill cleaner which can function to efficiently and effectively remove grease and physical debris from a grill in a single step, and without the drawbacks of the above noted devices.

SUMMARY OF THE INVENTION

The present invention is directed to a grill cleaning device. One embodiment of the present invention can include a main body having a top surface, a bottom surface and a plurality of side walls extending upward therefrom. A handle can be located at the center of the main body equidistantly from each of the side walls. The combination of the bottom surface, the side walls and the handle can form a pocket area for receiving a human hand and protecting the same from a hot grill.

In one embodiment, a plurality of elongated channels are disposed along the bottom surface of the main body. Each of the channels can include a particular shape, size and separation distance that is suitable for engaging rods of grill grates having different shapes and sizes.

In yet another embodiment, a plurality of protrusions are disposed along the bottom surface of the main body and function to scrub the grill grate rods.

This summary is provided merely to introduce certain concepts and not to identify key or essential features of the claimed subject matter.

BRIEF DESCRIPTION OF THE DRAWINGS

Presently preferred embodiments are shown in the drawings. It should be appreciated, however, that the invention is not limited to the precise arrangements and instrumentalities shown.

DETAILED DESCRIPTION OF THE INVENTION

Figure 1:
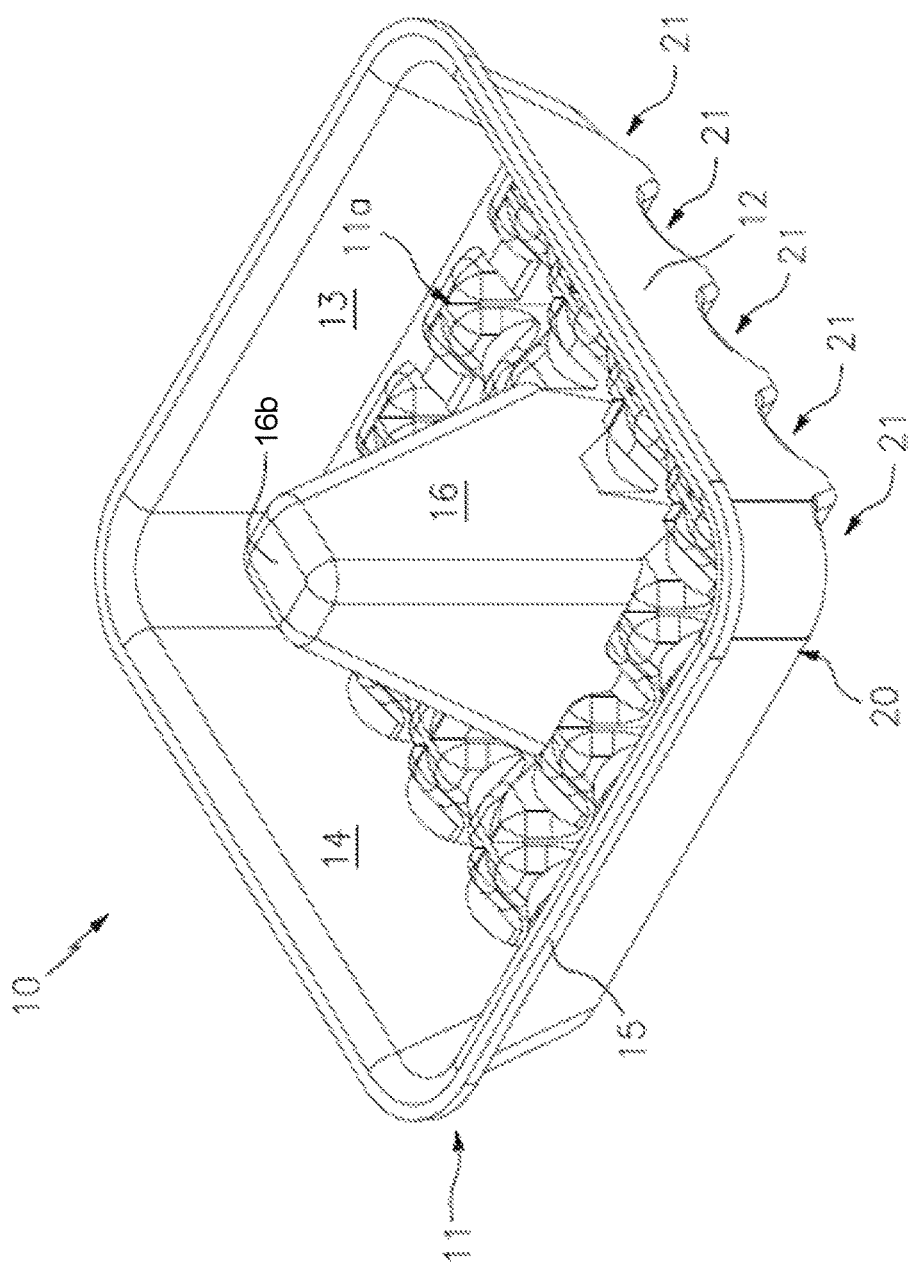
FIG. 1 is a perspective view of a disposable grill cleaning device that is useful for understanding the inventive concepts disclosed herein.

While the specification concludes with claims defining the features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention which can be embodied in various forms. Therefore, specific structural and functional details disclosed herein are not to be interpreted as limiting, but merely as a basis for the claims and as a representative basis for teaching one skilled in the art to variously employ the inventive arrangements in virtually any appropriately detailed structure. Further, the terms and phrases used herein are not intended to be limiting but rather to provide an understandable description of the invention.

Identical reference numerals are used for like elements of the invention or elements of like function. For the sake of clarity, only those reference numerals are shown in the individual figures which are necessary for the description of the respective figure. For purposes of this description, the terms "upper," "bottom," "right," "left," "front," "vertical," "horizontal," and derivatives thereof shall relate to the invention as oriented in FIG. 1.

As described throughout this document, the term "complementary shape," and "complementary dimension," shall be used to describe a shape and size of a component that is identical to, or substantially identical to the shape and size of another component.

FIGS. 1-5 illustrate various embodiments of a disposable grill cleaning device that is useful for understanding the inventive concepts disclosed herein. Although the device is described for use with a barbecue grill, the invention is not limited to any particular use or industry, as the device can be utilized for any number of different purposes, and/or to clean any number of different objects without limitation.

As shown best in FIG. 1, one embodiment of the device 10 can include a main body 11 having a plurality of raised side walls 12, 13, 14 and 15, a central handle 16, and a bottom surface 20.

In the preferred embodiment, the device can be constructed as a unitary element wherein each of the side walls 12-15 extends upward from the top surface 11a in an angular and/or generally orthogonal manner. As shown, the side walls can surround the handle 16 and the top surface 11a of the main body so as to create a pocket area into which a user's hand can rest when gripping the handle 16.

The central handle 16 provides a secure grip for allowing a user to manipulate the device along the grates of a grill while cleaning the same. In this regard, and owing to the construction of the device itself, the bottom and side walls can function to shield the users hand from excess heat when utilizing the device to clean a hot grill.

In the preferred embodiment, the central handle 16 can be hollow in nature, and can include an opening 16a along the bottom surface 20 which can allow multiple devices 10 to be stacked vertically, so as to reduce shipping and storage costs. Moreover, the central handle 16 can also include a generally flat upper end 16b that extends above the upper edge of each of the side walls 12-15. Such a feature advantageously allows the device to rest and be stored in an inverted position after each use, so as to prevent the soiled main body 11 and/or bottom surface 20 from making physical contact with clean surfaces.

In the preferred embodiment, the device 10 can include the illustrated square shape, and can be constructed from a combination of absorbent materials such as recycled paper and/or molded pulp, for example that is formed via a mechanized papier-mâché process or pulp slurry vacuum-forming process, for example. In this regard, the device 10 can be constructed as a unitary element, having any number of different thicknesses and/or pulp fiber length ratios, and can also be constructed so as to be rigid, semi-rigid, or generally non-rigid in nature, depending on the intended use of the device. By providing a smooth porous, and grease absorbing material, each portion of the device 10 that makes contact with the grates of a grill can function to clean and remove grease from the same.

Of course, the device 10 is not limited to any particular shape, material or construction methodology, as other embodiments are also contemplated. To this end, the device can be constructed to include any number of different shapes and sizes such as round, oval, pyramid, or rectangular, for example. Likewise, other construction materials and/or additives such as ceramic particles or animal by-products, for example, can also be included into the device so as to improve the sustainability and/or effectiveness of the same.

The bottom surface 20 of the device 10 can function to scrub debris from the grates of a grill and to absorb grease from the same. As is known to those of skill in the art, most commercially available grill grates are constructed from either steel or cast iron. Steel grates typically include a plurality of elongated tubular rods 5, whereas cast iron grates utilize elongated square or conical-shaped rods 6. The individual rods typically include a separation distance of between approximately 0.51 inches and approximately 0.91 inches, depending on the size of the grill. To this end, the device 10 can include a plurality of elongated channels, each having a shape, size and separation distance that is complementary to the shape, size and separation distance of a commercially available grill grate.

Figure 2:
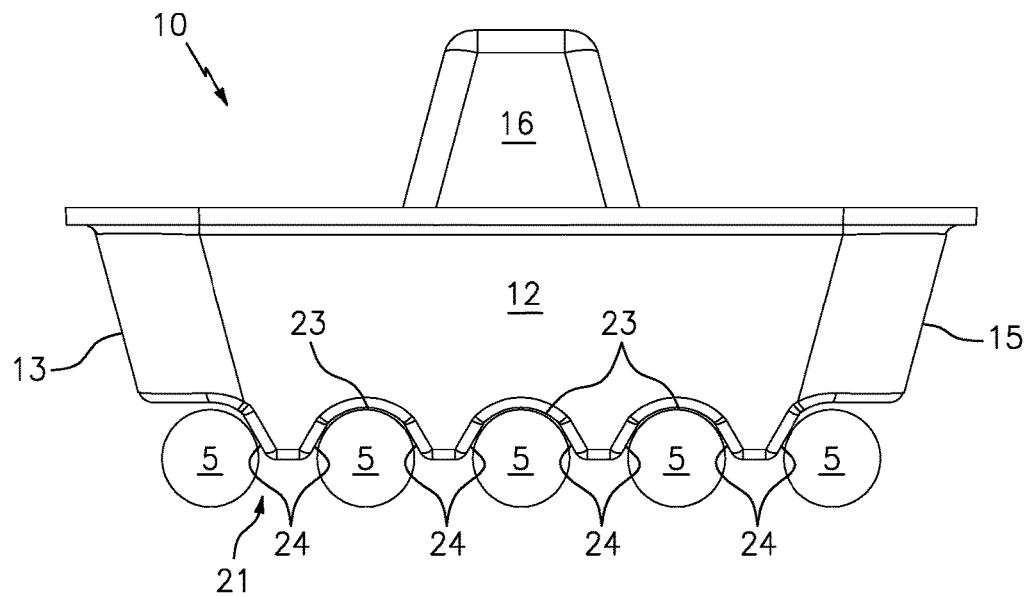
FIG. 2 is a side view of the disposable grill cleaning device in accordance with one embodiment of the invention.
Figure 3:
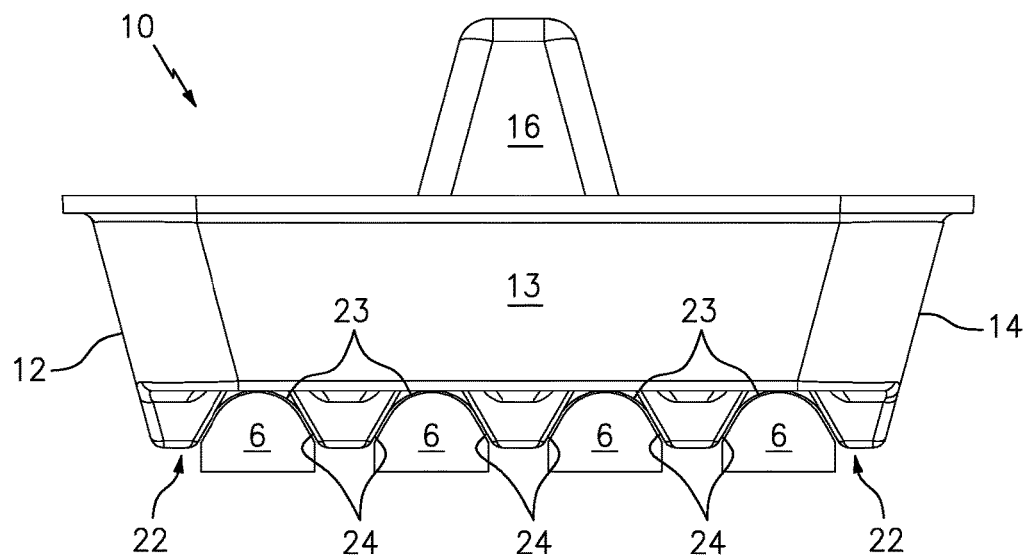
FIG. 3 is another side view of the disposable grill cleaning device in accordance with one embodiment of the invention.
Figure 4:
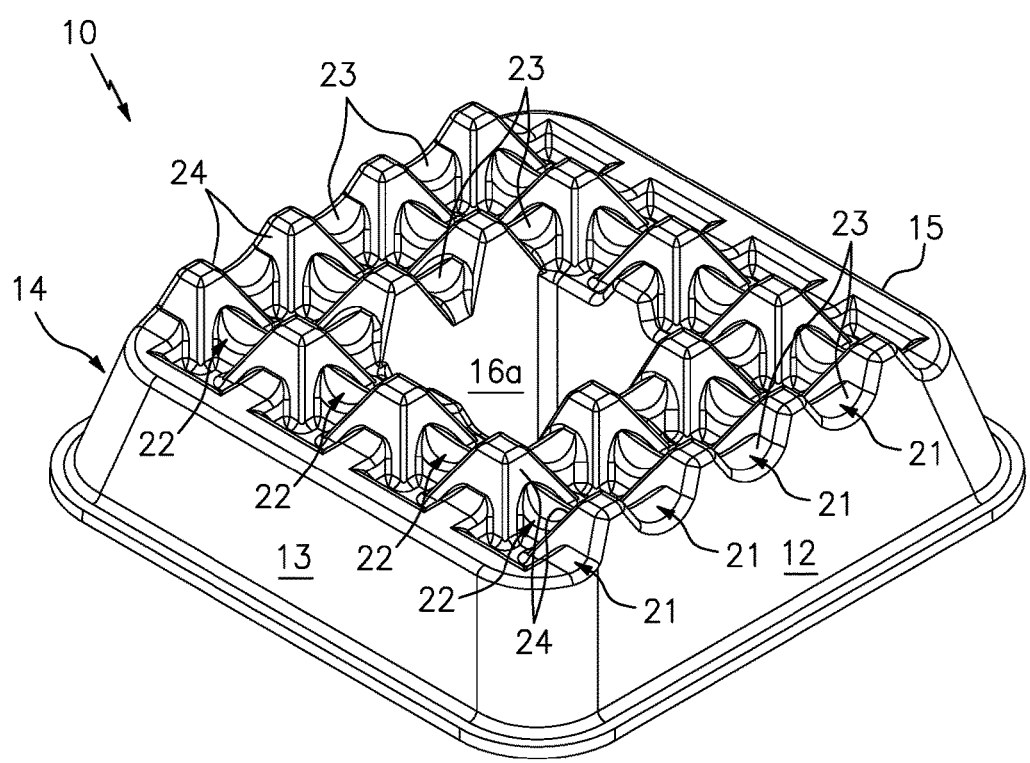
FIG. 4 is a bottom side view of the disposable grill cleaning device in accordance with one embodiment of the invention.

As shown in FIGS. 2-4, the device 10 can include a plurality of elongated channels 21 and 22 that are disposed along the bottom surface of the device 10, that extend between side walls 12 to 14, and 13-15, respectively. As shown, each of the channels 21 and 22 can include a plurality of generally curved ridges 23 that are designed to conform to the tubular shaped rods 5 found in commercially available steel grill grates Likewise, each of the channels 21 and 22 can also include a plurality of generally conical side wall protrusions 24 that are designed to conform to the conical shaped rods 6 found in commercially available cast iron grill grates.

In one preferred embodiment, channels 21 and 22 can be arranged along the bottom surface 20 so as to include different separation distances. To this end, note the arrangement of channels 21 which include a smaller separation distance so as to engage five steel or ceramic rods 5, whereas channels 22 include a larger separation distance so as to engage four cast iron grill grates 6. Of course, any number of different separation distances between the channels can be provided so as to allow the device to engage grill grates having any number of different separation distances.

The above described ridges and protrusions can extend along each of the elongated channels 21 and 22, and can function to make contact with the grill grates 5 and/or 6, and to remove debris and grease from the same during a scrubbing and cleaning operation. The protrusions can preferably be constructed from the same material as the main body so as to be integral thereto, but other construction materials and methodologies are also contemplated.

Figure 5:
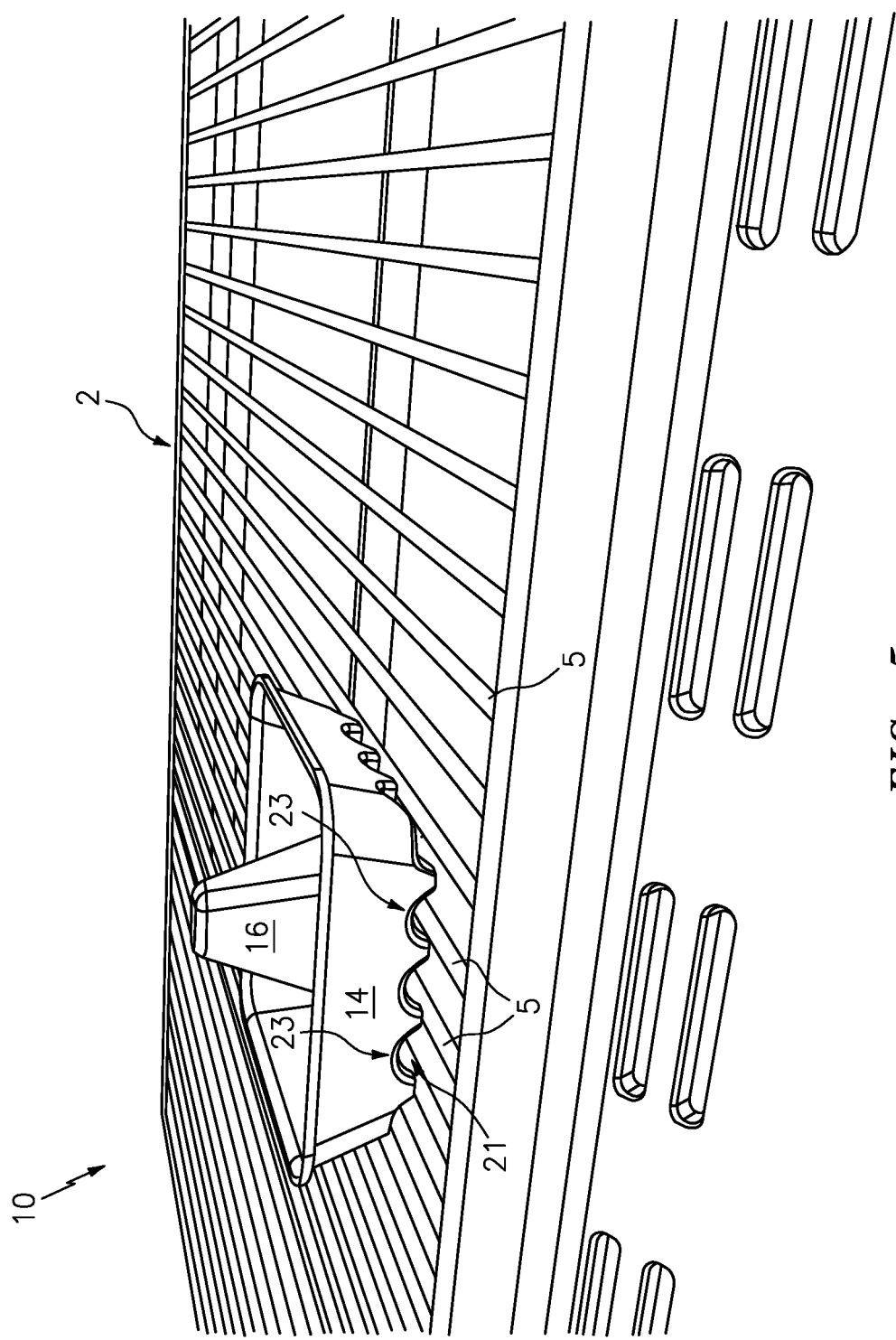
FIG. 5 is a perspective view of the disposable grill cleaning device in operation, and in accordance with one embodiment of the invention.

FIG. 5 illustrates one embodiment of the device 10 in operation to clean the grates 2 of a barbeque grill. As shown, the device can simply be placed onto the top surface of the grill grates so that the channels are aligned with the grate rods. At this time, the device can be manipulated via the handle 16 to perform a scrubbing motion along and across each of the individual rods. Owing to the complementary shape of the channels, the device advantageously conforms to the shape of the rods to ensure full contact along an entirety of the top and side surfaces thereof. Moreover, owing to the absorbent nature of the device, any accumulated grease is also seamlessly removed by a single wiping action.

As to a further description of the manner and use of the present invention, the same should be apparent from the above description. Accordingly, no further discussion relating to the manner of usage and operation will be provided.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A grill cleaning device, comprising:
 a main body that is constructed from a grease absorbing material and includes a top surface having an outer perimeter, a bottom surface, and a plurality of side walls extending upward along an entirety of the outer perimeter;
 a handle that extends upward from a center of the top surface of the main body, said handle being positioned equidistantly between the plurality of side walls;
 a first plurality of elongated channels that are disposed along the bottom surface in a first direction; and
 a second plurality of elongated channels that are disposed along the bottom surface in a second direction that is not parallel to the first direction.

2. The device of claim 1, wherein the main body includes a unitary construction.

3. The device of claim 1, further comprising:
 a plurality of protrusions that are disposed along the bottom surface of the main body.

4. The device of claim 1, wherein the handle includes a flat distal end that is located above each of the side walls, said flat distal end functioning to allow the device to be stored in an inverted position.

5. The device of claim 1, wherein the handle comprises a pyramid shape and has a hollow interior, and the device is configured to be stacked vertically with other identical devices.

6. The device of claim 1, wherein the main body includes a square shape, the device is a unitary element, and is constructed from at least one of a grease absorbing recycled paper and a molded pulp.

7. The device of claim 1, wherein the top surface is recessed relative to a top surface of the handle and a top surface of the side walls, to form a pocket area that is configured to shield a hand grasping the handle from a heat emanating from a grill being cleaned by the bottom surface of the main body.

8. The device of claim 1, wherein the first plurality of elongated channels and the second plurality of elongated channels are oriented perpendicular to each other.

9. The device of claim 1, wherein each elongated channel of the first plurality of elongated channels are arranged parallel to each other and include a first separation distance, and
 each elongated channel of the second plurality of elongated channels are arranged parallel to each other and include a second separation distance.

10. The device of claim 9, wherein the first separation distance is different from the second separation distance.

11. The device of claim 1, wherein the first plurality of elongated channels includes a shape and separation distance that is configured to engage five steel or ceramic grill rods.

12. The device of claim 1, wherein the second plurality of elongated channels includes a shape and separation distance that is configured to engage four cast iron grill grates.

* * * * *